(12) United States Patent
Bowden et al.

(10) Patent No.: US 11,675,493 B2
(45) Date of Patent: Jun. 13, 2023

(54) METHOD AND SYSTEM FOR COLLABORATING USING THE INTEGRATED LAPTOP TOUCHPAD

(71) Applicant: EMC IP Holding Company LLC, Hopkinton, MA (US)

(72) Inventors: David Andrew Bowden, Cork (IE); Aidan O Mahony, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/161,112

(22) Filed: Jan. 28, 2021

(65) Prior Publication Data
US 2022/0236847 A1 Jul. 28, 2022

(51) Int. Cl.
*G06F 3/0488* (2022.01)
*G06F 3/0354* (2013.01)

(52) U.S. Cl.
CPC ........ *G06F 3/0488* (2013.01); *G06F 3/03547* (2013.01)

(58) Field of Classification Search
CPC ..................... G06F 3/0488; G06F 3/03547
See application file for complete search history.

(56) References Cited

U.S. PATENT DOCUMENTS

| | | | | |
|---|---|---|---|---|
| 9,195,367 B2* | 11/2015 | Chakra | ................ | G06F 3/0482 |
| 9,483,156 B2* | 11/2016 | Mehta | ................ | G06F 3/0481 |
| 10,565,299 B2* | 2/2020 | Motoi | ................ | G06F 3/0484 |
| 2010/0039388 A1* | 2/2010 | Ku | ................ | G06F 1/1616 345/168 |
| 2011/0055329 A1* | 3/2011 | Abt, Jr. | ................ | G06F 16/958 709/205 |
| 2011/0181492 A1* | 7/2011 | Soeda | ................ | G09G 5/14 345/1.1 |
| 2013/0063547 A1* | 3/2013 | Kasuya | ................ | H04N 1/00251 348/14.08 |
| 2013/0129310 A1* | 5/2013 | Shustorovich | ......... | H04N 5/775 386/230 |
| 2013/0297690 A1* | 11/2013 | Lucero | ................ | H04W 48/16 709/204 |
| 2014/0143434 A1* | 5/2014 | Sanche | ................ | H04L 65/1069 709/228 |
| 2015/0046834 A1* | 2/2015 | Wu | ................ | H04L 51/04 715/748 |
| 2015/0046835 A1* | 2/2015 | Putz | ................ | G06F 3/0484 715/748 |
| 2015/0091808 A1* | 4/2015 | Shih | ................ | G06F 3/04886 345/169 |
| 2016/0103610 A1* | 4/2016 | Huh | ................ | G06F 3/14 345/168 |
| 2017/0169002 A1* | 6/2017 | Motoi | ................ | G06F 3/0484 |

* cited by examiner

Primary Examiner — Carolyn R Edwards
(74) Attorney, Agent, or Firm — Chamberlain, Hrdlicka, White, Williams & Aughtry

(57) ABSTRACT

A system and method for electronic collaboration including receiving, by a first digitizer of a first host, a mode switch notification, based on the mode switch notification, changing a mode of the first host to a collaborative mode, sending local content, by the first host, displayed on a multipurpose display screen of the first host to one or more collaboration hosts, receiving, by the first host, published content from the collaboration hosts, displaying the published content and the local content concurrently on the multipurpose display screen of the first host, and updating the multipurpose display screen with updated local content and received published content.

12 Claims, 5 Drawing Sheets

METHOD AND SYSTEM FOR COLLABORATING USING THE INTEGRATED LAPTOP TOUCHPAD

BACKGROUND

Remote collaborative working arrangements are of particular interest given the recent transformation of physical working environments to virtual working environments. But integration of remote collaboration with existing computing equipment, particularly, for the average working individual can stand to gain improvement.

SUMMARY

In general, an aspect of the invention includes a method of electronic collaboration of receiving, by a first digitizer of a first host, a mode switch notification, based on the mode switch notification, changing a mode of the first host to a collaborative mode, sending local content, by the first host, displayed on a multipurpose display screen of the first host to one or more collaboration hosts, receiving, by the first host, published content from the collaboration hosts, displaying the published content and the local content concurrently on the multipurpose display screen of the first host, and updating the multipurpose display screen with updated local content and received published content.

In general, in one aspect, the invention relates to a system that includes a processor and memory that includes instructions which, when executed by the processor, performs a method. The method includes receiving, by a first digitizer of a first host, a mode switch notification, based on the mode switch notification, changing a mode of the first host to a collaborative mode, sending local content, by the first host, displayed on a multipurpose display screen of the first host to one or more collaboration hosts, receiving, by the first host, published content from the collaboration hosts, displaying the published content and the local content concurrently on the multipurpose display screen of the first host, and updating the multipurpose display screen with updated local content and received published content.

In general, in one aspect, the invention relates to a non-transitory computer readable medium (CRM). The non-transitory CRM includes computer readable program code, which when executed by a computer processor, enables the computer processor to perform a method for electronic collaboration. The method includes receiving, by a first digitizer of a first host, a mode switch notification, based on the mode switch notification, changing a mode of the first host to a collaborative mode, sending local content, by the first host, displayed on a multipurpose display screen of the first host to one or more collaboration hosts, receiving, by the first host, published content from the collaboration hosts, displaying the published content and the local content concurrently on the multipurpose display screen of the first host, and updating the multipurpose display screen with updated local content and received published content.

Other aspects of the invention will be apparent from the following description and the appended claims.

DETAILED DESCRIPTION

Figure 1:
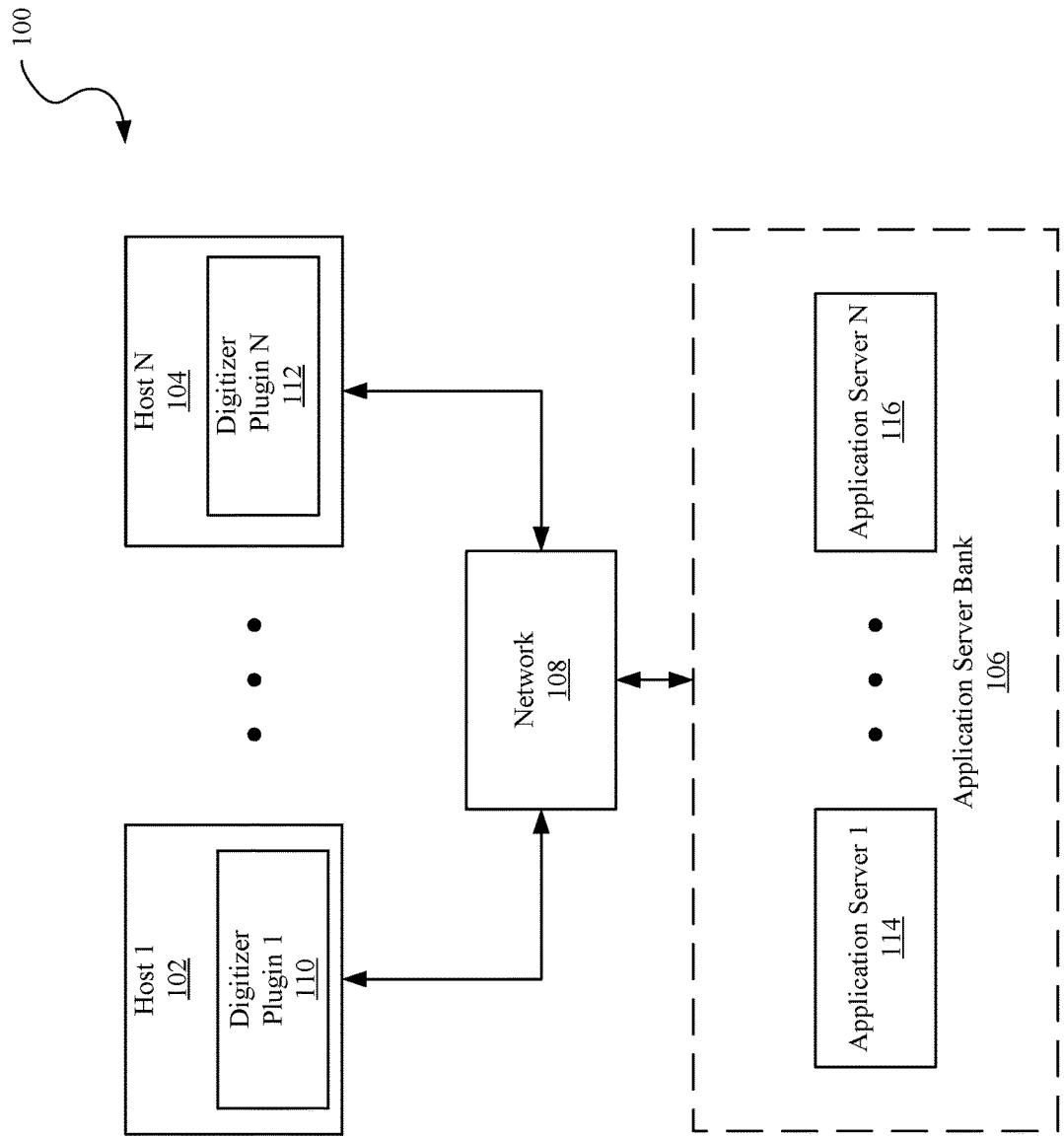
FIG. 1 shows an example system in accordance with one or more embodiments of the disclosure described herein.

Remote collaboration between members across organizations and members of various different organizations have gained particular popularity given the fast transformation of professional and academia transformation from working at a physical office to working from home. Individuals connect through various applications, such as the Microsoft Teams application and the Zoom application, through corresponding computing devices, such as laptops and tablets, to hold meetings, share ideas, and effectively carry out all work that was once primarily done in a traditional physical office setting.

In a traditional office setting, a whiteboard or a flip exhibit board is used to convey ideas, collaborate on ideas, flag potential design and other types of issues, or simply to manage projects. Clearly, electronic collaboration does not allow for such traditional collaboration schemes. But a conventional computing device, such as a laptop, may be re-configured to facilitate similar electronic collaboration. A digitizer in the form of a touch-sensitive screen (e.g., an integrated touchpad) or monitor allows a user to virtually interact with remotely located and electronically connected devices used by a members of the collaboration team.

The digitizer is effectively a second multipurpose screen with multiple modes. In one mode, the multipurpose screen may be a conventional multi-touch input device, and in another mode, the multipurpose screen may serve as additional display screen while another display screen, such as a primary display screen, may be simultaneously operational. Consider a scenario where a user electronically collaborates with other users with a laptop and the laptop has a primary screen, the display screen that folds upward when the laptop is opened, and a secondary display screen, a multipurpose display screen, located where the trackpad of the laptop is traditionally located. The multipurpose screen is a digitizer that operates in the two above-noted modes. In the first mode, the digitizer may be employed as a traditional trackpad and in the second mode, the digitizer may be employed as an electronic whiteboard allowing the user to graphically display thoughts and share ideas with other users who in turn share their thoughts and ideas via their corresponding laptops as though all users were physically located in a room sharing ideas on a whiteboard.

Continuing with the aforementioned example, each user may use a stylus to electronically draw or write their ideas on corresponding laptop digitizers simultaneously or non-simultaneously. The users may take turns, for example, to graphically convey thoughts in that while one user draws with a stylus on a corresponding laptop digitizer, the remaining users observe the drawings and each user may then comment by conveying their ideas with the stylus of their corresponding laptop on their digitizer for others to consume. The users need not use a stylus to input graphical information into the digitizer and can simply use their fingers or any other type of electronic writing device to which the digitizer may respond. But in some cases, the stylus may be the preferred method of choice particularly for conveying fine graphical details, not readily responded to be the digitizer with courser electronical writing tools.

In certain modes, the user may further overlay an application executing by a user computing device and shown on a primary display screen to the multipurpose display screen, perhaps, at a location closer to the user, such as in front of a laptop keyboard, for further convenience in interacting with the application.

Various embodiments of the disclosure are described below.

FIG. 1 illustrates an exemplary electronic collaboration system (100), according to one or more embodiments of the disclosure. As shown in FIG. 1, the electronic collaboration system (100) includes one or more hosts, host (102, 104), an application server bank (106), and a network (108). Each of the hosts, host (102, 104), is an example of a computing device. Further details of a computing device is presented below with reference to FIG. 5. Each of the hosts (102, 104) includes a corresponding digitizer plugin. For example, host (102) includes a digitizer plugin (110) and host (104) includes a digitizer plugin (112). System (100) may include "N" number of hosts, "N" being an integer value, accordingly, the system (100) may include N number of digitizer plugins.

The application server bank (106) includes one or more application servers (114), (116). In an embodiment of the invention, the application server bank (106) includes N number of application servers.

The hosts (102, 104) are operationally coupled to the application server bank (106) through the network (106). In one or more embodiments of the invention, each of the aforementioned components may communicate using any combination of wired and/or wireless communication technology. Each of the aforementioned components is described below.

In an embodiment of the disclosure, each of the hosts (102, 104) may be implemented using one or more computing devices (e.g., see FIG. 5) functionally equipped to receive input from a user and based on the input, process the user input by executing a corresponding digitizer plugin, and based on the processed user input, take an action based on the user input by, for example, graphically displaying the user input (not shown). Further details of each of the hosts (102, 104) are presented below with reference to FIGS. 2 and 5.

In one embodiment of the disclosure, the hosts (102, 104) are each a physical or virtual device that may be used for performing various embodiments of the disclosure. The physical device may correspond to any physical system with functionality to implement one or more embodiments of the disclosure. For example, the physical device may be a device or a part of or incorporated in a system with at least one or more processor(s) and memory.

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, each of the hosts (102, 104) includes executable instructions (stored in a non-transitory computer readable medium (not shown), which when executed, enable the hosts (102, 104) to perform one or more methods described below (see e.g., FIGS. 3, 4).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, the network (108) may be the medium through which the host (102) or (104) is operatively connected to an application server (114) or (116) of the application server bank (106). In one embodiment of the invention, the network (108) may include other network systems (not shown) that facilitate communication between the aforementioned components. As such, in one embodiment of the disclosure, the network (108) may include any combination of local and/or wide area (e.g., Internet) network segments that may be wire-based and/or wireless and that may use any combination of wired and/or wireless communication protocols.

As earlier noted, each of the hosts (102), (104) respectively includes the digitizer plugin (110), (112). In an embodiment of the invention, each of the hosts (102), (104) implements a digitizer by executing a respective digitizer plugin (110), (112) to receiving a mode switch notification, initiating a collaboration session between users of the hosts to enable the users to engage in electronic graphical interaction, through the network (108), and switching modes between a collaboration mode and a non-collaboration mode based on the mode switch notification. Each user is enabled to convey electronically drawn graphics representations of ideas and thoughts on display screens of other hosts. Users on the receiving end of the electronically drawn graphics representations may further receive, via corresponding digitizers of corresponding hosts, published content from a host and display on a multipurpose display screen published content in addition to local content.

Each of the digitizer plugins (110), (112) may be a software agent that when executed by a corresponding host (e.g., hosts (110), (112)), carries out digitizer functionality, as described herein. Further details of the digitizer plugins (110), (112) are presented below with reference to FIGS. 3-4.

In an embodiment of the disclosure, each of the application servers (114), (116), which is a host itself, may be implemented using one or more computing devices functionally equipped to receive published content from one of the hosts (102), (104) through the network (108), and to operatively communicate the published content to another one of the hosts (102), (104).

In one embodiment of the disclosure, each of the application servers (114), (116) is a physical or virtual device that may be used for performing various embodiments of the disclosure. In some embodiments of the invention, the application servers (114) may be implemented using one or more computing devices (e.g., see FIG. 5) functionally equipped to facilitate collaborative connectivity between the hosts (102, 104). For example, an application server may receive content from a host for publication to other hosts and wait for or request receive content from a host for publication wait for or request content for publication from one or other collaboration hosts and when the application server receives the published content from the collaboration hosts, publish the content to all collaboration hosts.

The physical device may correspond to any physical system with functionality to implement one or more embodiments of the disclosure.

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, each of the application servers (114), (116) of the application server bank (106) includes executable instructions (stored in a non-transitory computer readable medium (not shown), which when executed, enable the corresponding application server to perform one or more methods described below (see e.g., FIGS. 3, 4).

Figure 2:
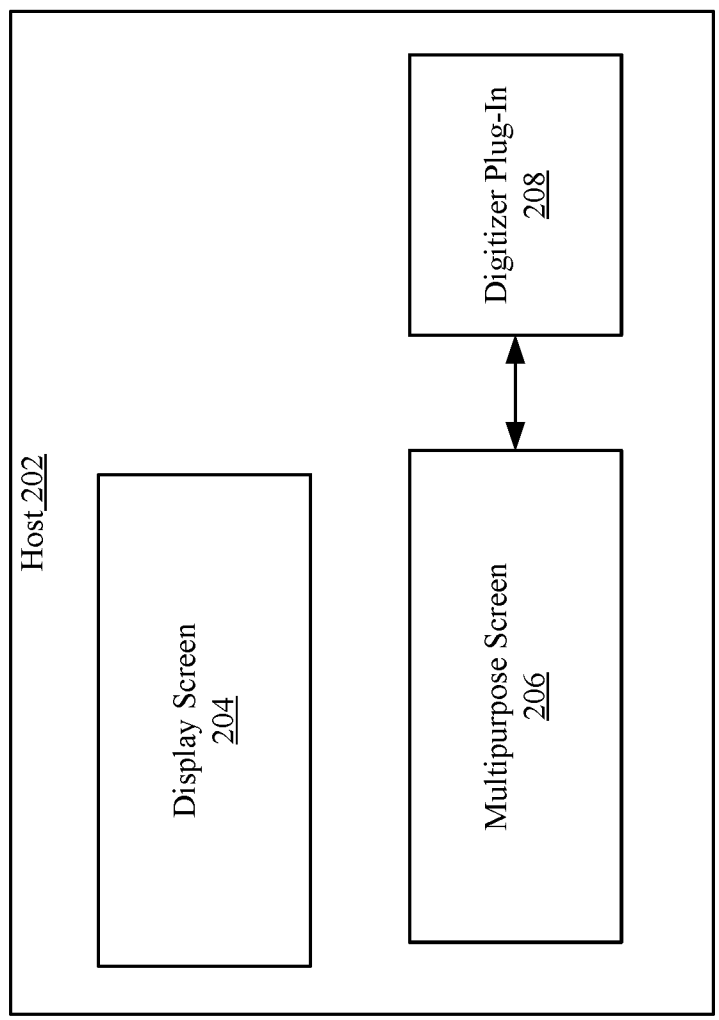
FIG. 2 shows an exemplary host in accordance with one or more embodiments of the disclosure described herein.

FIG. 2 illustrates an exemplary host (202), according to one or more embodiments of the disclosure. In an embodiment of the invention, the host (202) corresponds to one of the hosts (102), (104) of FIG. 1. As shown in FIG. 2, the host (202) includes a display screen (204), a multipurpose screen (206), and a digitizer plug-in (208). In an embodiments of the invention, the digitizer plug-in (208) corresponds to one of the digitizer plug-ins (110), (112) of FIG. 1.

In an embodiment of the disclosure, the display screen (204) may be implemented using one or more computing devices (e.g., see FIG. 5), for example, host (202), functionally equipped to display non-collaborative content, received from a user of the host (202) through a user interface (UI) (not shown).

In one embodiment of the disclosure, the display screen (204) is a physical or a virtual device that may be used for performing various embodiments of the disclosure. The physical device may correspond to any physical system with functionality to implement one or more embodiments of the disclosure. For example, the physical device may be a device or a part of or incorporated in a system with at least one or more processor(s) and memory.

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, the display screen (204) includes executable instructions (stored in a non-transitory computer readable medium (not shown), which when executed, enable the display screen (204) to perform one or more methods described below (see e.g., FIGS. 3, 4). In an embodiment of the invention, the display screen (204) may be a liquid crystal display (LCD) but the display screen (204) need not be a LCD type of display.

In an embodiment of the disclosure, the multipurpose display screen (206) may be implemented using one or more computing devices (e.g., see FIG. 5), for example, the host (202), functionally equipped to display local content published by a user of the computing device of which the multipurpose display screen (206) is a part of and collaboration content received from one or more computing device of which the multipurpose display screen (206) is not a part of and that may be remotely located wirelessly or by wire, in a collaborative mode. In an embodiment of the invention, the multipurpose display screen (206) may display temporary information received through a user interface (UI) of the host (202) (not shown), in a non-collaborative mode, for example, electronically notes originating from a user of the host (202). In an embodiment of the invention, the aspect ratio between the display screen (204) and the multipurpose display screen (206) is based on which display screen is the primary display screen of the host (202). For example, using the example of a laptop, the foldable larger screen may be the primary screen used by the user of the laptop for traditional display screen features, such as, without limitation, showing icons of applications, the opening and closing of applications, information regarding the operating system employed by the host, and streaming content. Further details of the hosts (102, 104) are presented below with reference to FIG. 5.

Each of the digitizer plugin (208) may be a software agent that when executed by a corresponding host (e.g., host (202)), carries out digitizer functionality, as described herein. Further details of the digitizer plugin (208) are presented below with reference to FIG. 3-4.

In one embodiment of the invention, the network (226) may be the medium through which the recovery appliances (224) and (228) are operatively connected to each other. As such, in one embodiment of the invention, the network (226) may include any combination of local and/or wide area (e.g., Internet) network segments that may be wire-based and/or wireless and that may use any combination of wired and/or wireless communication protocols.

Figure 3:
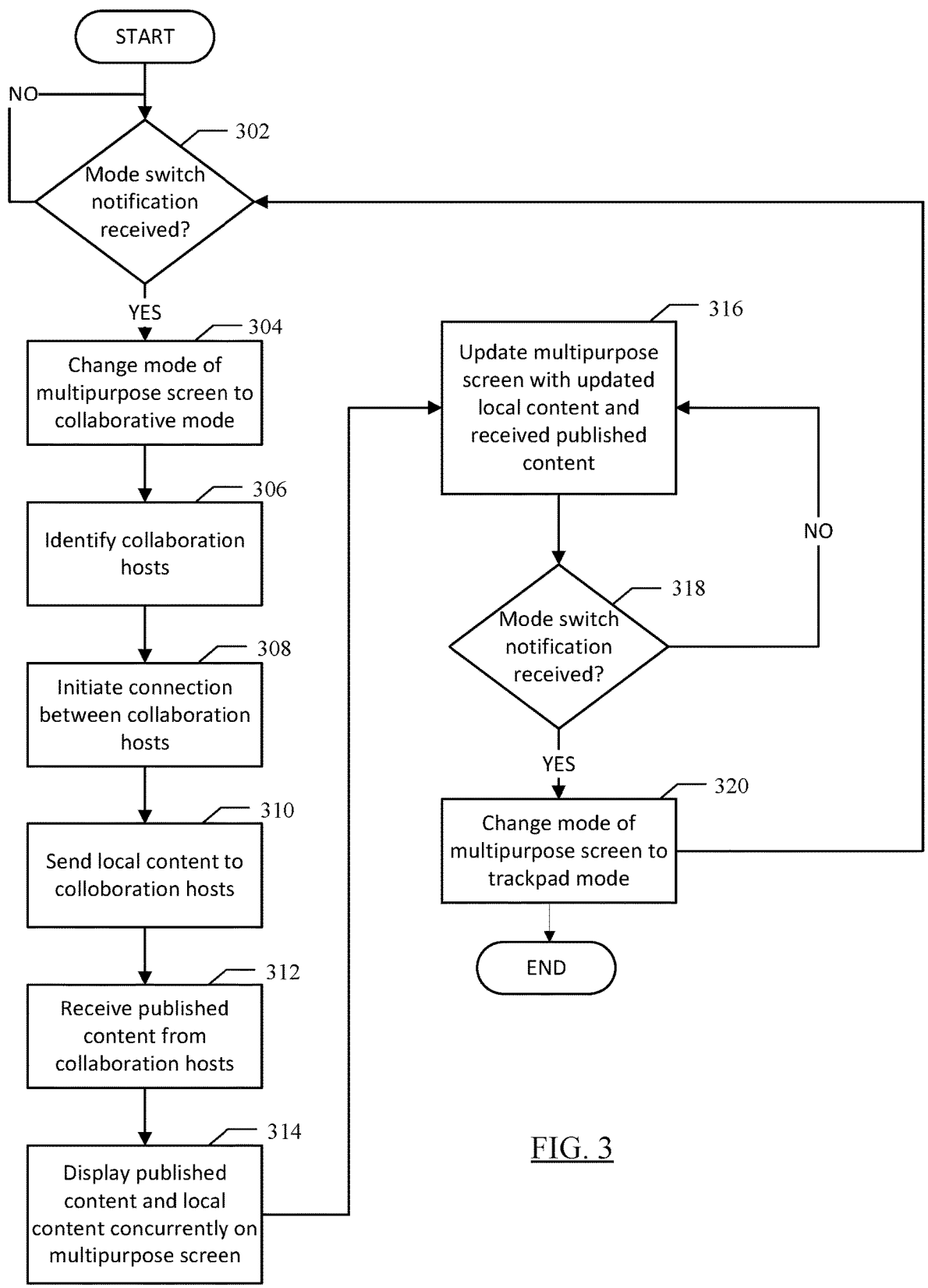
FIG. 3 shows a flowchart describing a method for electronic collaboration in accordance with one or more embodiments of the disclosure disclosed herein.
Figure 4:
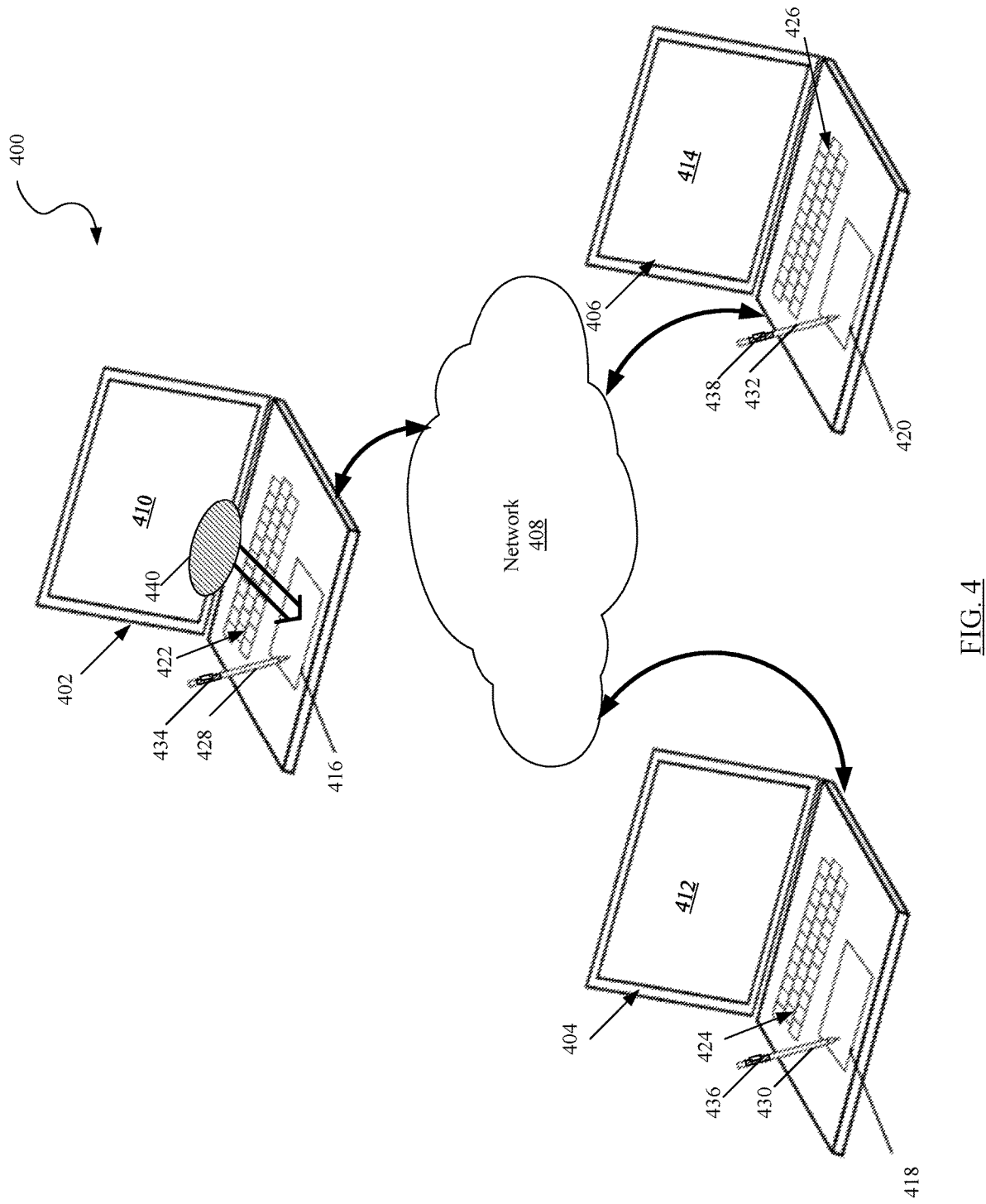
FIG. 4 shows an exemplary electronic collaboration system in accordance with one or more embodiments of the disclosure disclosed herein.

FIG. 3 shows a flowchart describing a method for electronic collaboration in accordance with one or more embodiments described herein. FIG. 4 shows an exemplary electronic collaboration system (400) in accordance with one or more embodiments of described herein. For clarity of illustration and without any limitation, the flowchart of FIG. 3 is described below relative to the example of FIG. 4. As described in further detail below, electronic graphics, an example of local content, may be drawn by a user of an originating host on the multipurpose display screen of the originating host while the electronic graphics is mirrored on the multipurpose display screen of one or more collaborative hosts. The multipurpose display screen of either the originating host or the collaborative hosts may switch between a touchpad mode, a non-collaborative mode, to a collaborative mode. When switching from the collaborative mode to the touchpad mode, in some embodiments of the invention, the collaboration session between the originating host and the collaboration hosts may be halted by a corresponding host and the touchscreen mode may be initiated by the corresponding host. Similarly, when switching from the non-collaborative mode to the collaborative mode, in some embodiments of the invention, the touchpad mode may be halted by a corresponding host and the collaboration mode may be initiated by the corresponding host.

The method of FIG. 3 may be performed by, for example, by the host (102) when executing the digitizer plugin (110), of FIG. 1, the host (104) when executing the digitizer plugin (112), of FIG. 1, or the host (202) when executing the digitizer plugin (208), of FIG. 2. Other components not illustrated in FIG. 1 or FIG. 2 may perform or assist in performing the method of FIG. 3 without departing from the disclosure.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 302, a mode switch notification is awaited by a host (e.g., 102, FIG. 1; 104, FIG. 1; 202, FIG. 2). The mode switch notification may switch the mode in which the host is currently operating from a non-collaboration mode to a collaboration mode, or vice versa. While in the non-collaboration mode, the digitizer plugin (e.g., 208, FIG. 2) directing the multipurpose display screen (e.g., 206, FIG. 2) of the host (e.g., 202, FIG. 2) operates a trackpad (e.g., 416, 418, 420, FIG. 4) of the host as a conventional trackpad. In some embodiments of the invention, in the non-collaboration mode, the trackpad may be used as a digital notepad or notebook for receiving user input—electronic notes—and causing the temporary electronic notes to display on the trackpad of the host. For the purpose of the example of FIG. 3, the mode is presumed to switch to a collaboration mode. In response to receiving the mode switch notification, the host proceeds to step 304.

At step 304, in response to receiving the mode switch notification indicative of switching to a collaboration mode, the host changes the mode of the multipurpose screen to a collaboration mode to initiate a collaboration session between a user of the host and one or more users of one or more other hosts. For example, in FIG. 4, the user of host 402 (e.g., a laptop) may initiate engaging in a collaboration session with the user of host 404 and/or the user of host 406.

In accordance with exemplary embodiments, the host may initiate engaging in a collaboration session in various ways. With reference to FIG. 4, the host (402) may activate a button (e.g., 434) on a stylus (e.g., 428) to start the collaboration session. The host may start the collaboration session without activating a button or other activation features of a stylus and instead, simply start moving the stylus on the top surface of an underlying multipurpose screen (e.g., 416, FIG. 4) making sure that the stylus makes contact with the multipurpose screen in a manner as to allow a corresponding digitizer (e.g., a digitizer plugin executing on the host 402) to process input received from the stylus. In another exemplary embodiment, a dedicated or a soft key of a host keyboard (e.g., 422, FIG. 4) may be activated to initiate the collaboration session. Alternatively, moving an overlay from the primary display screen of the host to toward the multipurpose display screen (e.g., 416, FIG. 4) may have the effect of initiating the collaboration session. For example, with reference to FIG. 4, a user of the host 402 moving an overlay 440 from the screen display 410 to the multipurpose display screen 416 may have the effect of initiating the collaboration session.

With reference to FIG. 3, at step 306, the host may identify the collaboration hosts, i.e., the hosts with which the user of the host is desirous of communicating via the multipurpose display screen. Using the example of FIG. 4, a user of the host 402 may indicate engaging in a collaboration session with the hosts (404) and (406). Alternatively, the user may indicate engaging in a collaboration session with one of the hosts (404) and (406) and/or with one or more hosts not shown in FIG. 4. The user of the host (402) may identify one or more hosts to collaborate with by activating a dedicated or soft key of the keyboard 422 or in another manner. The host (402), in response to the user input, may identify the collaboration through a host identification number, such as an address assigned to the collaboration hosts through a website portal.

In some embodiments of the invention, one or more collaboration hosts may directly collaborate with one another. As earlier noted, in some embodiments of the invention, collaboration may be facilitated by application servers (e.g., 114, FIG. 1). For example, an application server identifies collaborators and provide a participating host with a listing of the available collaborators. The user may select the collaborators through a corresponding host, for example, by identifying collaboration hosts in an electronic collaboration application (e.g., (e.g., 208, FIG. 2). The application server facilitates a connection between the collaborators—e.g., Host A<--> application server<--> host B and host C, etc. In this manner, the host only needs to display and/or publish content but not necessarily establish and manage connectivity between collaborators.

In response to the collaboration host identification of step 306, at step 308, the host initiates a connection with the collaboration hosts. For example, with reference to FIG. 4, a wireless connection or a wired connection may be established through the network (408) between the host (402) and one or more collaboration hosts (404) and (406).

At step 310, the input received from the stylus movement across the multipurpose display screen—local content—is sent by the host 402 to the collaboration hosts (404) and/or (406) through the network (408). Content that is local to the host (402) will be received, in real-time or near real-time, as published content to the collaboration hosts. Accordingly, at step 312, the collaboration hosts receive the published content from the host (402).

At step 314, the collaboration hosts display the published content on their respective multipurpose display screens. For example, the host (404) may display the published content on the multipurpose display screen (418) and/or the host (406) may display the published content on the multipurpose display screen (420). In some embodiments of the invention, at step 314, the multipurpose display screen of respective collaboration hosts may concurrently or near concurrently display content local to the respective collaboration hosts. For example, as the multipurpose display screen (418) of the host (404) displays the published content, received through the network (408) from the host (402), the multipurpose display screen (418) may concurrently display content generated by a user of the host (404) as the user moves the stylus (430) across the multipurpose display screen (418). The user of the host (402) may have drawn a model of an engineering design—local content to the host (402)—that is displayed published content on the multipurpose display screen (418) of the host (404) while the user of the host (404) draws additional suggested features to the model with the stylus (430)—content that is local to the host (404)—on the multipurpose display screen (418) simultaneously as the displaying of the host (402) published content. In some embodiments of the invention, a user may not use a stylus to draw on the multipurpose display screen (418). For example, the user may use a fingertip to enter local content.

At step 316, the local content displayed on the multipurpose display screen of an originating host may be updated and similarly, the published content displayed on the and at step 316, the multipurpose display screen may be updated with local content and similarly of a collaborative host may be updated. For example, with reference to FIG. 4, as the user of host (404) changes, adds to or deletes information of the local content displayed on the multipurpose display screen (418), the multipurpose display screen (418) is updated to reflect the changed, added, or deleted information. Similarly, as the user of host (402) changes, adds to or deletes information of the published content displayed on the multipurpose display screen (418), the multipurpose display screen (418) is updated to reflect the changed, added, or deleted information. In some embodiments of the invention, execution of respective digitizer plugins may cause the updating or origination of content. For example, a digitizer plugin (e.g., 208, FIG. 2) of the host (404) may update or originate the local content of the multipurpose display screen (418) and update the published content on the multipurpose display screen (418). Similarly, a digitizer plugin of the host (406) may update or originate the local content of the multipurpose display screen (420) and update the published content on the multipurpose display screen (420).

Referring back to FIG. 3, at step 318, the host awaits another mode switch notification from the current collaborative (multipurpose) mode to a non-collaborative mode. In response to receipt of the mode switch notification, the host switches the multipurpose display screen to a non-collaborative (trackpad) mode, at step 320. At or after step 320, the multipurpose display screen may be a traditional trackpad or it may be serve as an electronic notebook. For example, with respect to FIG. 4, assuming the host (406) switches modes at step 320 of FIG. 3, a user of the host (406) may take electronic notes by reflective movements of the stylus 432 across the multipurpose display screen (420) of the host (406) where the stylus-generated input is temporarily stored in a storage (e.g., 506, FIG. 5) of the host (406).

Figure 5:
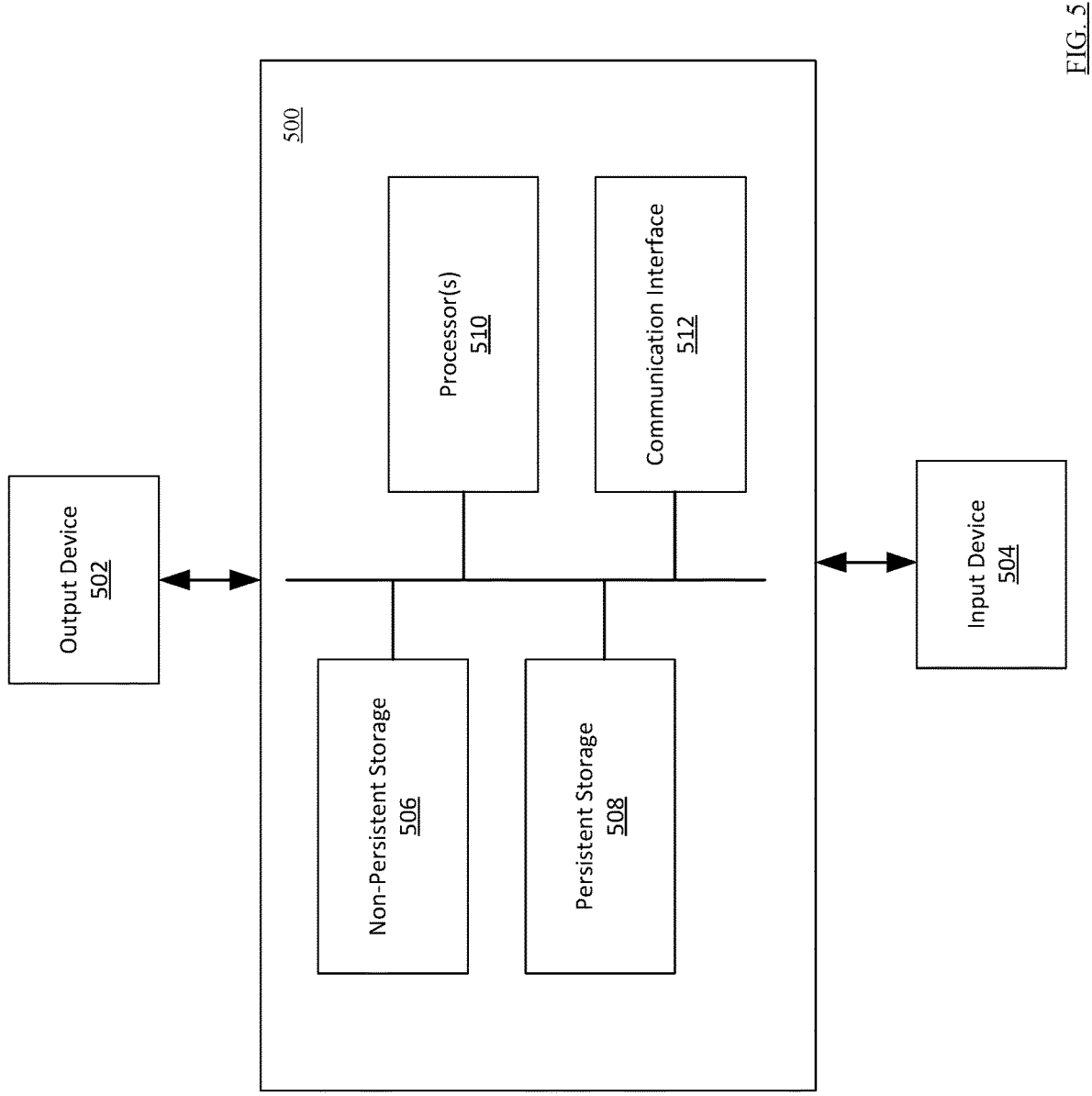
FIG. 5 shows an example host in accordance with one or more embodiments described herein.

As discussed above, embodiments of the disclosure may be implemented using computing devices. FIG. 5 shows a diagram of a computing device in accordance with one or more embodiments of the disclosure.

The computing device (500) may include one or more computer processors (510), non-persistent storage (506) (e.g., volatile memory, such as random access memory (RAM), cache memory), persistent storage (508) (e.g., a hard disk, an optical drive such as a compact disk (CD) drive or digital versatile disk (DVD) drive, a flash memory, etc.), a communication interface (512) (e.g., Bluetooth® interface, infrared interface, network interface, optical interface, etc.), input devices (504), output devices (502), and numerous other elements (not shown) and functionalities. Each of the components illustrated in FIG. 5 is described below.

In one embodiment of the disclosure, the computer processor(s) (510) may be an integrated circuit for processing instructions. For example, the computer processor(s) may be one or more cores or micro-cores of a processor. The computing device (500) may also include one or more input devices (504), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the disclosure, the computing device (500) may include one or more output devices (502), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (510), non-persistent storage (506), and persistent storage (508). Many different types of computing devices exist, and the aforementioned input and output device(s) may take other forms.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of electronic collaboration, comprising:
   receiving, by a digitizer, a mode switch notification, wherein the mode switch notification originates from moving an application that is being displayed on a display screen to the digitizer,
   wherein a host comprises the display screen, the digitizer, and a keyboard,
   wherein the host further comprises a first portion and a second portion, wherein the display screen is located on the second portion of the host, wherein the digitizer and the keyboard are located on the first portion of the host, and wherein the first portion of the host and the second portion of the host are physically distinct,
   wherein the keyboard is a physical keyboard,
   wherein the application executes on the host,
   wherein the digitizer is a multipurpose display screen that functions as a multi-touch input device in a trackpad mode and as a second display screen in a collaboration mode,
   wherein, as the second display screen, the digitizer displays electronically drawn graphics as a local content;
   based on the mode switch notification, changing a mode of the host to the collaboration mode;
   after changing the mode to the collaboration mode:
      sending the local content, by the host, displayed on the digitizer to one or more collaborative hosts;
      receiving, by the host, published content from one or more of the collaborative hosts;
      displaying the published content and the local content concurrently on the digitizer;
      updating the digitizer with updated local content and received published content;
      receiving, after the updating, a second mode switch notification by the host; and
      based on the second mode switch notification, changing the mode of the host from the collaboration mode to the trackpad mode, when the host is in the trackpad mode, the digitizer operates as a traditional trackpad.

2. The method of claim 1, further comprising:
   identifying the collaborative hosts by the host.

3. The method of claim 1, further comprising:
   initiating connections between the collaborative hosts by the host.

4. The method of claim 1, wherein the host is an electronic notebook.

5. A system, comprising:
   a display screen, wherein the system further comprises a first portion and a second portion, wherein the display screen is located on the second portion of the system, and wherein the first portion of the system and the second portion of the system are physically distinct,
      wherein the display screen displays an application executing on the system;
   a digitizer, wherein the digitizer is a multipurpose display screen that functions as a multi-touch input device in a trackpad mode and as a second display screen in a collaboration mode,
      wherein, as the second display screen, the digitizer displays electronically drawn graphics as a local content,
      wherein the digitizer is located on the first portion of the system; and
   a keyboard, wherein the keyboard is located on the first portion of the system and the keyboard is a physical keyboard;
   a processor; and
   memory comprising instructions which, when executed by the processor, perform a method, the method comprising:
      receiving, by the digitizer, a mode switch notification, wherein the mode switch notification originates from moving the application to the digitizer;
      based on the mode switch notification, changing a mode of the system to the collaboration mode;
      after changing the mode to the collaboration mode:
         sending the local content displayed on the digitizer to one or more collaborative hosts;
         receiving published content from one or more of the collaborative hosts;
         displaying the published content and the local content concurrently on the digitizer;
         updating the digitizer with updated local content and received published content;
         receiving, after the updating, a second mode switch notification by the system; and
         based on the second mode switch notification, changing the mode of the system from the collaboration mode to the trackpad mode, when the system is in the trackpad mode, the digitizer operates as a traditional trackpad.

6. The system of claim 5, wherein the method further comprises identifying the collaborative hosts by the system.

7. The system of claim 5, wherein the method further comprises initiating connections between the collaborative hosts by the system.

8. The system of claim 5, wherein in the system is an electronic notebook.

9. A non-transitory computer readable medium comprising computer readable program code, which when executed by a computer processor enables the computer processor to perform a method for electronic collaboration, the method comprising:

receiving, by a digitizer, a mode switch notification, wherein the mode switch notification originates from moving an application that is being displayed on a display screen to the digitizer, wherein a host comprises the display screen, the digitizer, and a keyboard, wherein the host further comprises a first portion and a second portion, wherein the display screen is located on the second portion of the host, wherein the digitizer and the keyboard are located on the first portion of the host, and wherein the first portion of the host and the second portion of the host are physically distinct, wherein the keyboard is a physical keyboard, wherein the application executes on the host, wherein the digitizer is a multipurpose display screen that functions as a multi-touch input device in a trackpad mode and as a second display screen in a collaboration mode, wherein, as the second display screen, the digitizer displays electronically drawn graphics as a local content;

based on the mode switch notification, changing a mode of the host to the collaboration mode;

after changing the mode to the collaboration mode:

sending the local content, by the host, displayed on the digitizer to one or more collaborative hosts;

receiving, by the host, published content from one or more of the collaborative hosts;

displaying the published content and the local content concurrently on the digitizer;

updating the digitizer with updated local content and received published content;

receiving, after the updating, a second mode switch notification by the host; and based on the second mode switch notification, changing the mode of the host from collaboration mode to the trackpad mode, when the host is in the trackpad mode, the digitizer operates as a traditional trackpad.

10. The non-transitory computer readable medium of claim 9, the method further comprising:

identifying the collaborative hosts by the host.

11. The non-transitory computer readable medium of claim 9, the method further comprising:

initiating connections between the collaborative hosts by the host.

12. The non-transitory computer readable medium of claim 9, wherein the host is an electronic notebook.

* * * * *